UNITED STATES PATENT OFFICE.

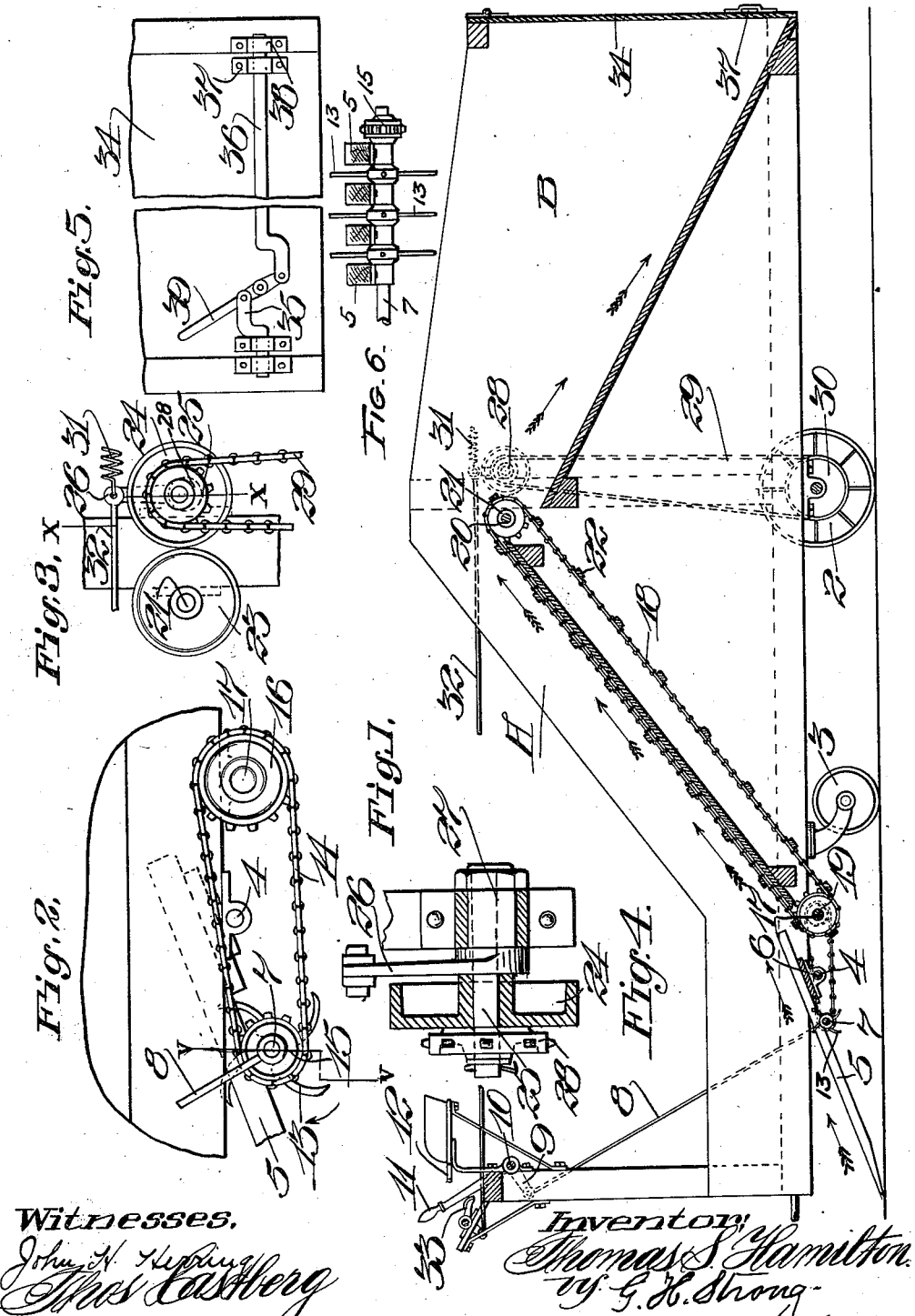

THOMAS S. HAMILTON, OF KING CITY, CALIFORNIA.

HAY OR GRAIN GATHERING MACHINE.

1,022,733. Specification of Letters Patent. Patented Apr. 9, 1912.

Application filed April 12, 1911. Serial No. 620,551.

*To all whom it may concern:*

Be it known that I, THOMAS S. HAMILTON, citizen of the United States, residing at King City, in the county of Monterey and State of California, have invented new and useful Improvements in Hay or Grain Gathering Machines, of which the following is a specification.

This invention relates to a hay-gathering machine.

It is the object of this invention to provide a hay-gathering machine which is simple in construction and operation, and which is adapted to collect scattered hay and deposit it in cocks preparatory to loading and stacking or baling.

A further object is to provide means in a a hay-gathering machine for easily and quickly throwing the gathering parts out of this operative position and for controlling the movements of a conveyer.

Another object is to provide means for collecting the gathered hay on the machine and delivering it therefrom in bunches.

The invention consists of the parts and the construction and combination of parts, as hereinafter more fully described and claimed, having reference to the accompanying drawings, in which—

Figure 1 is a vertical, longitudinal section of the invention. Fig. 2 is a detail side elevation of the accelerator. Fig. 3 is a detail side elevation of the clutch mechanism for controlling the movement of the conveyer. Fig. 4 is a vertical section on the line X—X, Fig. 3. Fig. 5 is a detail in elevation of the end-gate locking device. Fig. 6 is a sectional detail on the line V—V of Fig. 2.

In the drawings, A represents the machine carriage which is mounted on a pair of truck-wheels 2, only one of which is shown, disposed rearward of the lateral center of the carriage; a caster-wheel 3 being provided at a point on the longitudinal center of the underside of the carriage A in front of the truck-wheels 2. The caster-wheel 3 and the truck-wheels 2 comprise the running-gear, on which the machine carriage A is adapted to travel.

Mounted on the carriage A adjacent to its forward end is a rock-shaft 4, which extends laterally across the underside of the carriage frame and has a number of rake-teeth 5 supported thereon. The rake-teeth 5 extend forward of the rock-shaft 4 with their outer ends normally resting on the ground; the inner ends of the teeth projecting a short distance rearward of the rock-shaft and terminating over the lower end of a conveyer. The teeth 5 are here shown as mounted on a board 6 which is attached to the rock-shaft 4 in any suitable manner; this board 6 extending beneath the teeth 5 parallel with the shaft 4 and adjacent to the upper ends thereof.

Supported in suitable bearings mounted on the underside of the end teeth 5 is a revoluble shaft 7, which extends beneath the teeth 5 parallel with the rock-shaft 4, and is connected at its outer ends to connecting rods 8 (only one of which is shown), which rods extend upward and are attached at their upper ends to crank arms 9 mounted on a rock-shaft 10. This shaft 10 is designed to be rocked by means of a hand-lever 11, so as to elevate the outer ends of the rake-teeth 5 clear of the ground; the lever 11 being engaged by a hook 12 to retain it in a fixed position in opposition to the weight of the teeth 5 when the latter are in their raised position.

Mounted on the revoluble shaft 7 in the space separating each rake-tooth 5 is an accelerator which consists of radially disposed curved blades 13, the outer ends of which blades, when rotated, project a short distance above the upper face of the adjacent teeth 5; these blades 13 being adapted to accelerate the upward movement of hay picked up by the rake-teeth 5 and forced to travel upward over the teeth 5 as the carriage A moves forward. The accelerating blades 13 thus permit the hay piling up and collecting on the teeth 5 and also insures a steady feed or discharge of the hay over the upper ends of the teeth on to the conveyer. The shaft 7, carrying the blades 13 is rotated by means of a sprocket chain 14, which passes around a sprocket wheel 15 on the shaft 7 and around a sprocket wheel 16 on a revoluble shaft 17 disposed beneath the carriage A adjacent to, and parallel with the rock-shaft 4.

The conveyer, previously mentioned, consists of a pair of spaced, parallel, sprocket chains 18 (only one of which is shown), which pass around sprocket wheels 19 on the shaft 17 and around similar sprocket wheels 20 on a revoluble shaft 21 disposed above, and parallel with, the shaft 17 and rearward thereof; a series of slats 22 being mounted on the chains 18 in such manner that when the chains 18 are revolved, the slats 22 will engage the hay discharged over the upper ends of the teeth 5 and carry it up and discharge it over the shaft 21 into a hopper or bin B formed on the carriage A. The shaft 21 has a friction disk 23 mounted thereon, which is adapted to be engaged by a similar disk 24 revolubly mounted on a gudgeon 25 formed on a lever-arm 26, which lever-arm is fulcrumed eccentric to the axis of the gudgeon 25; a stud 27 on the lever-arm 26 being mounted in a suitable bearing on the frame of the carriage A. The friction disk 24 has a sprocket wheel 28 formed integral therewith around which an endless sprocket chain 29 passes. The chain 29 extends downward and passes around a sprocket wheel 30 formed on the hub of one of the truck-wheels 2. It will be seen from this that the friction disk 24 will be rotated continuously when the truck-wheels 2 are revolved by the carriage A being drawn across the ground.

Means are provided for normally holding the friction disk 24 out of contact with the disk 23, which means are here shown as consisting of a helical spring 31. This spring 31 is connected to the upper end of the lever-arm 26 and exerts a backward pull thereon in such manner as to normally retain the disk 24 out of engagement with the disk 23; the conveyer and the accelerator thus being normally retained out of operative connection with the driving mechanism.

As a means for throwing the disk 24 into driving engagement with the disk 23 and thereby cause the conveyer and accelerator to operate as the carriage A moves forward, a rod 32 is attached to the upper end of the lever-arm 26 and is carried forward and connected to a foot-lever 33, in such manner that by depressing the lever 33, the arm 26 will be moved forward so as to throw the engaging surface of the disk 24 into operative contact with the disk 23.

The operation of the invention is clearly apparent from the foregoing, it being manifest that, by throwing the lever 11 forward, to lower the outer ends of the rake-teeth 5 into contact with the ground and depressing the foot lever 33, a forward movement of the carriage A will cause the hay, or other material to be stacked, to move upward on the teeth 5 and deposited on the conveyer, the accelerator and conveyer being rotated in the direction of the arrows shown in Fig. 1, by the action of the mechanism illustrated in Figs. 2, 3 and 4. The hay is discharged over the upper end of the conveyer into the hopper B where it is collected, to be finally discharged by the opening of an end gate 34. This gate is hinged at its upper end and swings outward at the bottom. Draw bolts 35—36 are slidably mounted in straps 37 on the gate, as shown in Fig. 5, and are adapted to be thrown into engagement with straps 38 on the frame of the carriage A to lock the gate in a closed position. A lever 39 is connected to the inner ends of the bolts 35—36, the bolts being attached thereto on opposite sides of the fulcrum point in such manner that they will reciprocate in opposite directions in relation to each other as the lever 39 is operated. The lever 39 may be actuated in any suitable manner to unlock the gate 34 and permit it to swing open. The bottom of the hopper B slopes downward from the upper end of the conveyer and terminates at the bottom of the carriage A a short distance above the ground; the inclined bottom causing the hay deposited thereon to slide therefrom when the gate 34 is opened.

Having thus described my invention, what I claim and desire to secure by Letters Patent is—

1. In a hay-gathering machine, the combination of a carriage, a rock-shaft thereon, a series of rake-teeth mounted on said rock-shaft, a revoluble shaft mounted on and carried beneath said rake-teeth, a series of radially disposed, curved blades mounted on said revoluble shaft, said blades adapted to extend between the adjacent rake-teeth, and means for raising and lowering said revoluble shaft to raise and lower the outer ends of said rake-teeth.

2. In a hay-gathering machine, the combination of a carriage, a rock-shaft thereon, a series of rake-teeth mounted on said rock-shaft, a revoluble shaft mounted on and carried beneath said rake-teeth, a series of radially disposed, curved blades mounted on said revoluble shaft, said blades adapted to extend between the adjacent rake-teeth, means for raising and lowering said revoluble shaft to raise and lower the outer end of said rake-teeth, a traveling conveyer leading from below the upper ends of said rake-teeth to a hopper, means for moving said conveyer through the running gear of said carriage, and means for rotating said revoluble shaft by the operation of said conveyer.

3. In a hay-gathering machine, the combination of a carriage, a rock-shaft thereon, a series of rake-teeth mounted on said rock-shaft, a revoluble shaft mounted on and carried beneath said rake-teeth, a series of radially disposed, curved blades mounted on said revoluble shaft, said blades adapted to extend between the adjacent rake-teeth, means for raising and lowering said revoluble shaft to raise and lower the outer ends of said rake-teeth, a traveling conveyer leading from below the upper ends of said rake-teeth to a hopper, means for moving said conveyer through the running gear of said carriage, means for rotating said revoluble shaft by the operation of said conveyer, and means for throwing the conveyer in or out of operative engagement with the running gear.

4. In a hay-gathering machine, the combination of a carriage, a rock-shaft thereon, a series of rake-teeth mounted on said rock-shaft, a revoluble shaft mounted on and carried beneath said rake-teeth, a series of radially disposed, curved blades mounted on said revoluble shaft, said blades adapted to extend between the adjacent rake-teeth, means for raising and lowering said revoluble shaft to raise and lower the outer ends of said rake-teeth, a traveling conveyer leading from below the upper ends of said rake-teeth to a hopper, upper and lower shafts over which the conveyer passes, means for moving said conveyer through the running gear of said carriage, means for rotating said revoluble shaft by the operation of said conveyer, means for throwing the conveyer in or out of operative engagement with the running gear, said means consisting of a friction disk mounted on a gudgeon, a lever arm on which said gudgeon is mounted, said lever arm fulcrumed eccentric to the axis of said gudgeon, a similar friction disk on the upper conveyer shaft, a spring on said lever arm for normally retaining the friction disk out of engagement with said similar disk, and means for actuating said lever to throw said first named friction disk into operative connection with the second named disk in opposition to said spring.

5. In a hay-gathering machine, the combination of a carriage, a rock-shaft thereon, a series of rake-teeth mounted on said rock-shaft, a revoluble shaft mounted on and carried beneath said rake-teeth, a series of radially disposed, curved blades mounted on said revoluble shaft, said blades adapted to extend between the adjacent rake-teeth, means for raising and lowering said revoluble shaft to raise and lower the outer ends of said rake-teeth, a traveling conveyer leading from below the upper ends of said rake-teeth to a hopper, means for moving said conveyer through the running gear of said carriage, means for rotating said revoluble shaft by the operation of said conveyer, means for throwing the conveyer in or out of operative engagement with the running gear, said means consisting of a friction disk mounted on a gudgeon, a lever arm on which said gudgeon is mounted, said lever arm fulcrumed eccentric to the axis of said gudgeon, a spring on said lever arm for normally retaining the friction disk out of engagement with a similar disk on a shaft for moving the conveyer, means for actuating said lever to throw said first named friction disk into operative connection with the second named disk in opposition to said spring, a hopper disposed beneath the upper end of said conveyer to receive hay discharged therefrom, and means for emptying the hopper of the hay collected therein.

In testimony whereof I have hereunto set my hand in the presence of two subscribing witnesses.

THOMAS S. HAMILTON.

Witnesses:
HARRY BOGGIS,
E. C. GRISWOLD.

---

Copies of this patent may be obtained for five cents each, by addressing the "Commissioner of Patents, Washington, D. C."